United States Patent
Knutsson et al.

(10) Patent No.: US 12,146,404 B2
(45) Date of Patent: Nov. 19, 2024

(54) SUBSEA SENSOR MODULE, SYSTEM AND METHOD

(71) Applicant: Siemens Energy AS, Oslo (NO)

(72) Inventors: Hans Knutsson, Stord (NO); Andrew Robert Eastoe, Urangsvåg (NO); Kjetil Haldorsen, Rubbestadneset (NO)

(73) Assignee: Siemens Energy AS, Oslo (NO)

( * ) Notice: Subject to any disclaimer, the term of this patent is extended or adjusted under 35 U.S.C. 154(b) by 82 days.

(21) Appl. No.: 17/788,913

(22) PCT Filed: Jan. 5, 2021

(86) PCT No.: PCT/EP2021/050053
§ 371 (c)(1),
(2) Date: Jun. 24, 2022

(87) PCT Pub. No.: WO2021/140086
PCT Pub. Date: Jul. 15, 2021

(65) Prior Publication Data
US 2023/0022527 A1 Jan. 26, 2023

(30) Foreign Application Priority Data
Jan. 7, 2020 (GB) ...................................... 2000192

(51) Int. Cl.
*E21B 47/001* (2012.01)
*E21B 47/017* (2012.01)
*G01D 11/24* (2006.01)

(52) U.S. Cl.
CPC .......... *E21B 47/017* (2020.05); *E21B 47/001* (2020.05); *G01D 11/245* (2013.01)

(58) Field of Classification Search
CPC .... G01D 11/245; E21B 47/017; E21B 47/001
See application file for complete search history.

(56) References Cited

U.S. PATENT DOCUMENTS 3,876,972 A * 4/1975 Garrett ................ E21B 47/13
73/862.339
9,719,819 B2 8/2017 Strub
(Continued)

FOREIGN PATENT DOCUMENTS

| CN | 1530646 A | 9/2004 | |
| CN | 105324641 A | 2/2016 | |
| EP | 3511519 A1 * | 7/2019 | ........... E21B 47/017 |

OTHER PUBLICATIONS

Brett Paul et al.; "Ultra high-pressure risers for deepwater drilling", Deep Offshore Proceedings, Nov. 1, 2009 (Nov. 1, 2009), pp. 1-11, XP055799214.
(Continued)

*Primary Examiner* — Jamel E Williams
(74) *Attorney, Agent, or Firm* — Wolter Van Dyke Davis, PLLC

(57) ABSTRACT

A subsea sensor module includes a sensor housing having a first section, a second section and a third section, each section having an outer profile and a module flange having an inner profile. An outer surface of the flange is substantially perpendicular to an outer surface of the housing in the first section. The housing outer profile and flange inner profile are substantially the same along the second section of the housing. A shoulder is formed in the housing outer profile in the third section by a transition of the diameter of the outer profile from a smaller to a larger diameter. The flange has a corresponding shoulder in the flange inner profile; wherein the flange is shrink fit mounted radially outwardly of the sensor housing second section such that the shoulders are in contact.

15 Claims, 4 Drawing Sheets

(56) References Cited

U.S. PATENT DOCUMENTS 10,047,599 B2 * 8/2018 Maeland ................. E21B 47/06
2009/0101411 A1 4/2009 Hannegan
2012/0048038 A1 3/2012 Furlong

OTHER PUBLICATIONS

International search report and written opinion dated May 10, 2021 for corresponding PCT/EP2021/050053.

* cited by examiner

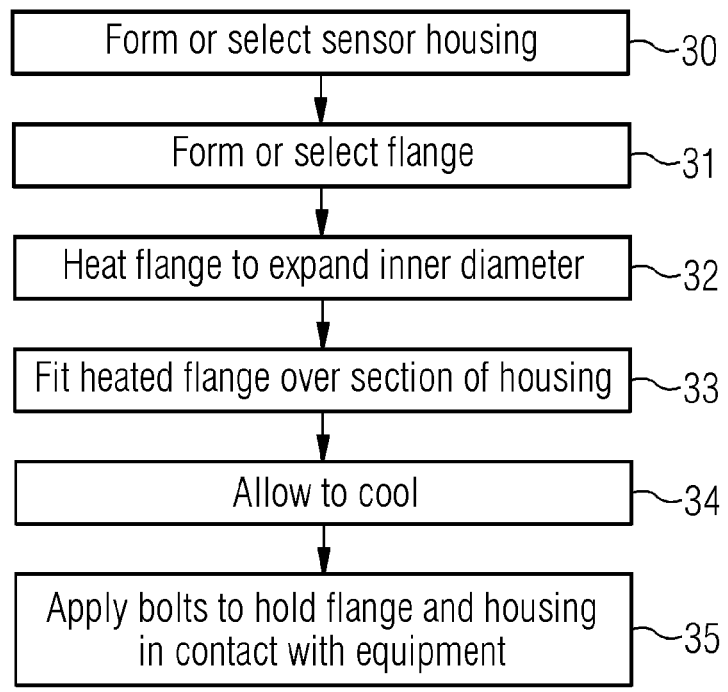
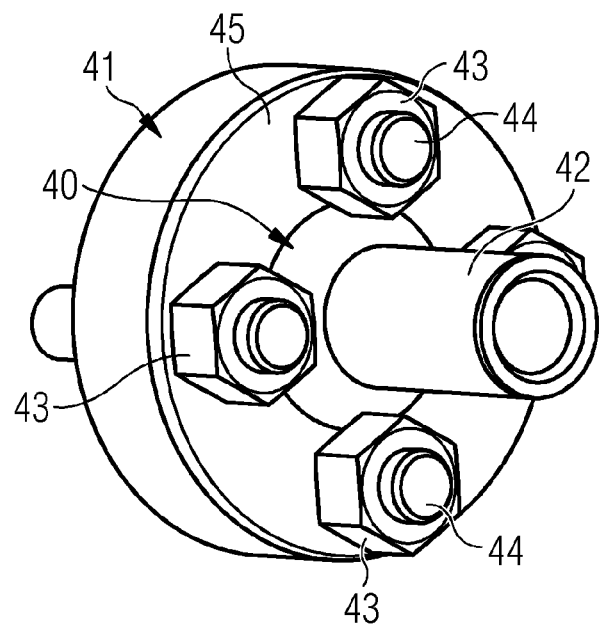

SUBSEA SENSOR MODULE, SYSTEM AND METHOD

CROSS REFERENCE TO RELATED APPLICATIONS

This application is the US National Stage of International Application No. PCT/EP2021/050053 filed 5 Jan. 2021, and claims the benefit thereof. The International Application claims the benefit of United Kingdom Application No. GB 2000192.1 filed 7 Jan. 2020. All of the applications are incorporated by reference herein in their entirety.

FIELD OF INVENTION

The present disclosure relates to a subsea sensor module, in particular for a subsea sensor system and to a method of manufacturing a subsea sensor module.

BACKGROUND OF INVENTION

Subsea pressure and temperature sensors are known. They may be used to measure pressure or temperature at different locations on a subsea hydrocarbon production or processing facility, for example on a subsea Christmas tree or in a subsea flow line. The sensors may be provided with data communication and power via cables, which may be connected to a subsea control module. Redundancy may be provided by doubling the number of sensors in the system. There are strict regulatory requirements to be met for subsea operation which often lead to large, heavy and expensive designs.

SUMMARY OF INVENTION

In accordance with a first aspect of the present invention, a subsea sensor module comprises a sensor housing, the sensor housing having a first section, a second section and a third section, each section having an outer profile; and a module flange having an inner profile; wherein an outer surface of the flange is substantially perpendicular to an outer surface of the housing in the first section, wherein the housing outer profile and flange inner profile are substantially the same along the second section of the housing; wherein a shoulder is formed in the housing outer profile in the third section by a transition of the diameter of the outer profile from a smaller to a larger diameter; wherein the flange comprises a corresponding shoulder in the flange inner profile; and, wherein the flange is shrink fit mounted radially outwardly of the sensors housing second section, such that the shoulders are in contact.

The present invention addresses the problems mentioned above by providing a new design that allows a sufficiently reliable construction of a sensor module for use subsea, whilst reducing the overall size, weight and cost. Manufacturing the housing and flange separately allows for customisation and shrink fitting the flange to the housing provides good adhesion between the parts, so that the equipment may be deployed for use within higher pressure applications subsea. This technique enables a fitting to be made without any shoulder on the outside of flange, so that larger nuts may be fitted into the same available diameter of the flange. Forces that are applied to the sensor module are transmitted as if there was a single piece, but by making the housing and flange in two pieces, the available space for fixing the flange is increased.

The housing may comprise a first material and the flange comprises a second material, different from the first material. The first material may be one which remains solid at a higher temperature than the second material. Making the two pieces from different materials, allows the overall cost to be reduced.

The sensor housing profile in the first section may comprise a hollow cylinder.

This allows the sensor/s and associated electronics to be mounted within the housing.

The sensor module may further comprise fasteners adapted to fix the flange and housing to other equipment.

The fasteners may comprise stud bolts and hex nuts, in particular 1" heavy hex nuts.

This meets certain standard requirements for operation at depth, subsea.

The sensor module may be rated at up to 15K PSI.

The housing may comprise a corrosion resistant alloy, in particular a nickel-chromium-molybdenum alloy.

The sensor module may comprise at least two separate sensing channels.

Thus, the sensor module may comprise dual functionality.

The sensors may comprise pressure, temperature, or a combination of both pressure and temperature sensors.

In accordance with a second aspect of the present invention, a method of manufacturing a subsea sensor module, the module comprising a sensor housing, the sensor housing having a first section, a second section and a third section, each section having an outer profile and a module flange having an inner profile; wherein an outer surface of the flange is substantially perpendicular to an outer surface of the housing in the first section, wherein the profiles are substantially the same along the second section of the housing, wherein a shoulder is formed in the housing outer profile in the third section by a transition of the diameter of the outer profile from a smaller to a larger diameter; wherein the flange comprises a corresponding shoulder in the flange inner profile; and, the method comprising selecting a sensor housing; selecting a flange; heating the flange or cooling the sensor housing, such that the inner profile of the flange increases, or the outer profile of the housing decreases, sufficiently to enable the flange to be mounted radially outwardly of the sensor housing; and cooling the flange, or heating the sensor housing, sufficiently to bring the housing flange shoulder and corresponding module flange shoulder into contact by shrink fitting.

The housing may comprise a first material and the flange comprises a second material, different from the first material. The first material may be one which remains solid at a higher temperature than the second material.

The sensor housing typically comprises a hollow cylinder.

The method may further comprise fixing the module to equipment using suitable mechanical fasteners.

BRIEF DESCRIPTION OF THE DRAWINGS

An example of a subsea sensor module and system according to the present invention will now be described with reference to the accompanying drawings in which:

FIG. 7 is a flow diagram of an example of a method of assembling the subsea module of FIG. 1; and, FIG. 8 illustrates a conventional single piece machined flange and housing.

DETAILED DESCRIPTION OF INVENTION

Figure 1:
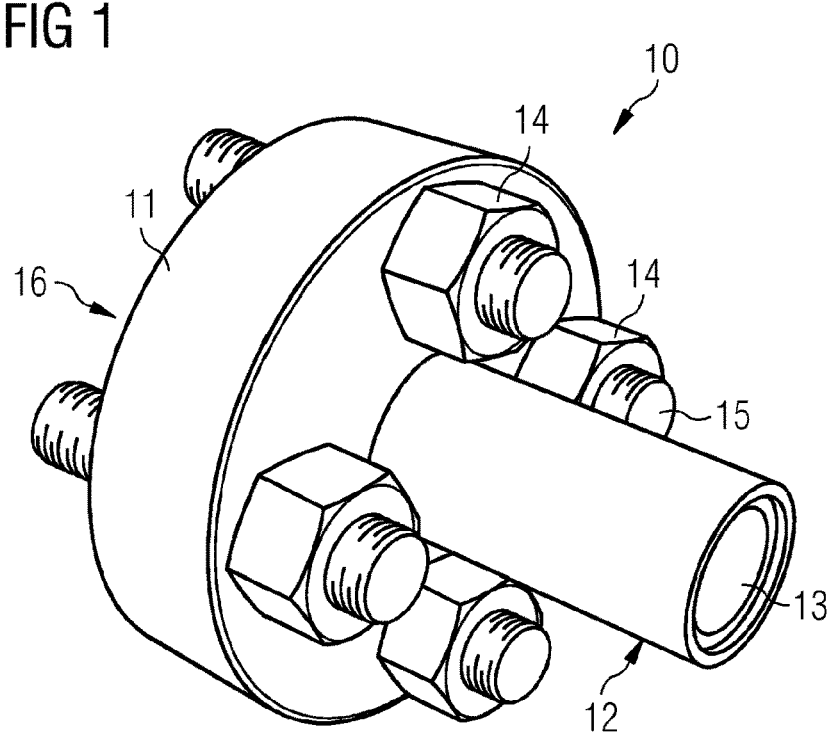
FIG. 1 illustrates an example of a subsea sensor module according to an embodiment of the present invention.

Subsea sensors, such as pressure and temperature sensors are typically mounted in a housing, which incorporates a mounting flange in order to couple the sensor in its housing to a device to be monitored, such as a subsea flow line, or subsea Christmas tree, in which pressure and temperature of fluid within the line or tree are to be detected and monitored. Other types of sensors may be mounted in such a housing, such as flow, vibration, or erosion monitoring sensors. Typically, in order to achieve the regulatory requirements of being able to withstand the operating pressures subsea, which may be up to, or even exceed, 15 K PSI (103,421 kPa), the mounting flange is combined with the sensor housing and formed from a single piece of suitable material, such as super duplex stainless steel. In order to machine the housing and for there to be sufficient strength as the diameters change, a shoulder is formed in the transition between the housing and the flange. The mounting flange typically includes a flange groove into which a ring gasket can be fitted to seal the flange. Such ring gaskets are standardised, for example BX type ring gaskets. The housing has a given thickness of material to meet the required standards and the flanges are chosen to fit with standardised gaskets.

However, this combination may prevent the use of addition fixtures that are desirable for operation at such pressures from being used, because of space constraints. For example, API 6A (ISO10423) specifies standards for stud bolts and nuts to fix the flange to the equipment onto which the flange is mounted. Currently, pressure and temperature sensors utilising BX-150 designs of flange, gasket seal ring size and shape, can only take 1" (0.0254 m) socket head cap screws (1" heavy hex studbolt and nut) because there is insufficient space to accommodate an API 6A specified nut for a given housing thickness. This can be seen in FIG. 8 illustrating a conventional machined flange and housing transition piece 40 between a disc shaped section 45 forming a flange 41 and a cylindrical section 42 of the sensor housing. With this design, the addition of sufficiently large nuts and bolts to meet the regulatory requirements is not possible because, as can be seen in the figure, the nuts 43 would overlap the raised shoulder and if they do not sit square on the surface 45, the forces may damage, or distort, the bolts 44 and not have the desired effect in withstanding pressure at depth subsea. The present invention addresses this problem to produce a small and lightweight subsea dual sensor, able to operate at up to 15K PSI. The sensors may be pressure, temperature, or a combination of both pressure and temperature and the novel design allows a BX-150 interface which is compatible with API 6A/ISO10423 studbolt and nut requirements to be used. The standards require the design to be able to accommodate a 1" (0.0254 m) heavy hex nut to fix the flange in place.

Figure 5:
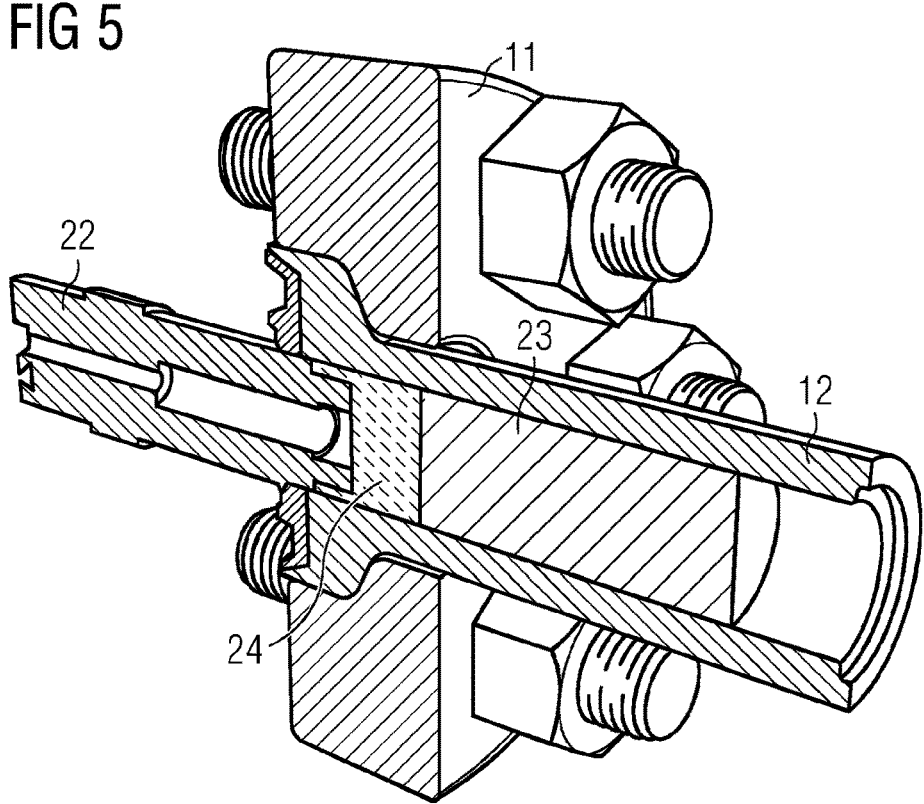
FIG. 5 illustrates the location of sensors and electronics in an example of a subsea module according to the invention.

FIG. 1 illustrates an example of a sensor module 10 according to the present invention, showing the sensor housing 12 and flange arrangement 11, fixed by nuts 14 and bolts 15. Although the same materials could be used for both parts, advantageously, the housing 12 and flange 11 comprise different materials, such as a corrosion resistant alloy for the housing, in particular a nickel-chromium-molybdenum alloy and Duplex type steel for the flange. Other material combinations may be used, such as nickel-chromium-molybdenum alloy within the housing combined with a carbon steel or austenitic stainless steel for the flange. The housing 12 in this example is BX-150 housing, in the form of a hollow cylindrical housing in which sensors (for example as shown in FIG. 5) can be mounted. Alternatively, other types of housing gaskets may be used, for example BX-151, BX-152 and BX-154, in which the designs currently meet the API requirements for bolting, but by being designed to incorporate the shrink fit aspect of the invention, such designs are also able to save on size, weight and cost. Advantageously, the shrink fitting is carried out by heating up the flange to expand it so that it will fit over the hollow cylindrical housing and then shrink back to its original size. However, it would be possible, although less desirable, to use liquid nitrogen to cool the cylindrical housing sufficiently to fit that into the flange opening and allow the housing to expand back into the flange inner diameter as it returns to room temperature, forming the interference fit in that way. The internal profile 13 of the housing is of substantially constant diameter for both the housing and housing hub sections 12, 18. Instead of forming the flange 11 and housing 12, 18 from a single piece of material, as has been done conventionally, the flange and housing are formed separately.

The housing is formed as a continuous cylinder with constant inner diameter, having a first housing section 12 of substantially constant wall thickness, typically in the range of 9 mm to 10 mm wall thickness and a second housing hub section 18 of increased thickness, typically in the range 24 mm to 26 mm, forming a load shoulder. The housing 12, 18 comprises a suitable corrosion resistant material, such as a nickel-based alloy, for example 625 alloy, which is a nickel-chromium-molybdenum alloy. Such alloys are typically non-magnetic as well as corrosion and oxidation resistant. The flange 11 is formed separately as a ring 16, with a face that is adapted to seal against an equivalent face (not shown) of the equipment onto which the sensor module 10 is to be mounted.

Figure 2:
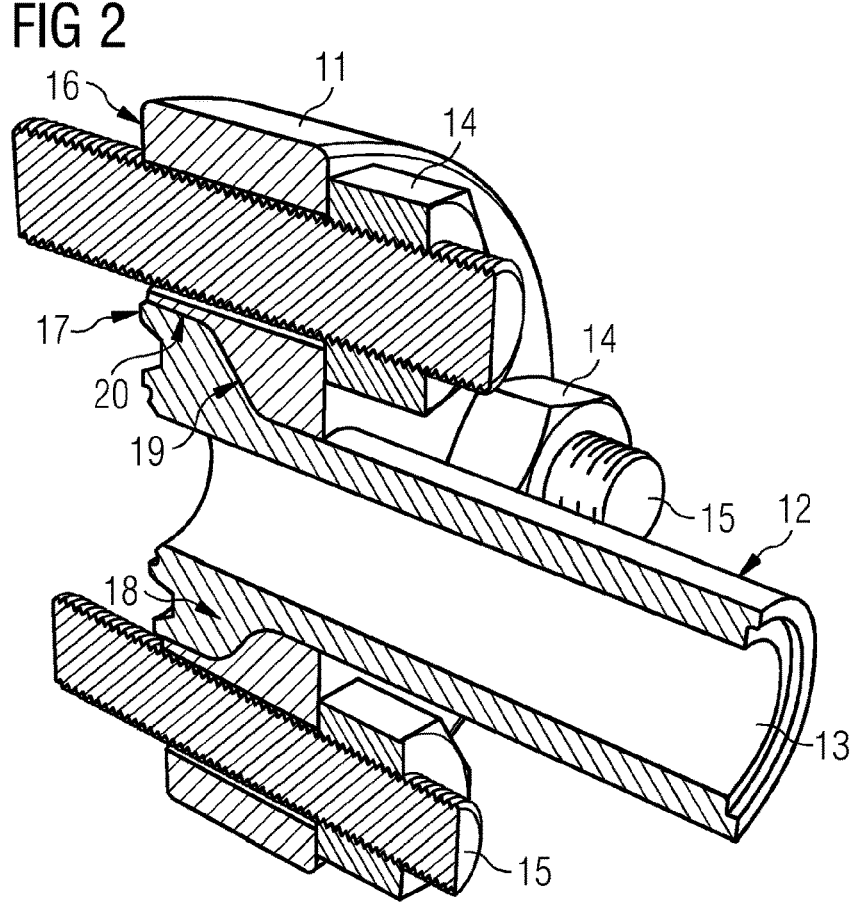
FIG. 2 illustrates more detail of part of the subsea module of FIG. 1.

As can be seen more clearly in FIG. 2, the housing is shaped, such that a hub 18, including a load shoulder 19, is formed at the wider end, where the diameter of the housing transitions from the substantially constant cylindrical form 12 to the section of increased thickness 18. In addition, at the end of the second section, in the hub 18, a groove is formed between ridges 17, into which a gasket may be fitted to seal against the corresponding surface of the equipment (not shown). The internal profile of the flange 11 is chosen to have a corresponding load shoulder.

The sensor module is manufactured by combining the housing and flange. The housing is formed with its load shoulder 19 in the hub 18, where the external diameter of the housing transitions from a first diameter in section 12 to a second, increased, diameter in section 18. The flange 11 is formed with a corresponding load shoulder 19, so that the internal diameter of the flange has the same profile as the equivalent section of external diameter of the housing. Having formed the housing and flange separately, for example as stock items for later assembly, when constructing the sensor module, the sensors are fitted within the housing 12 and the flange is then heated in order to temporarily increase its internal diameter, which allows the flange to be slid over the narrower end of the housing and then allowed to cool back to room temperature and to its original dimensions.

When the module is to be installed on equipment, then the pairs of nuts and bolts 14, 15 are fitted and tightened to hold the sealing faces of the sensor module and the equipment together. By forming the two parts and joining them in this way, the shoulder, which in a conventional single piece machined housing and flange combination takes up space on the inner surface and limits the size of nuts that can be used, has been subsumed into the flange lower surface and leaves a clear flat area with the maximum possible dimensions, onto which the nuts can be tightened. This allows larger nuts and bolts to be used in the same diameter, so meeting more stringent standards for subsea equipment.

Figure 3:
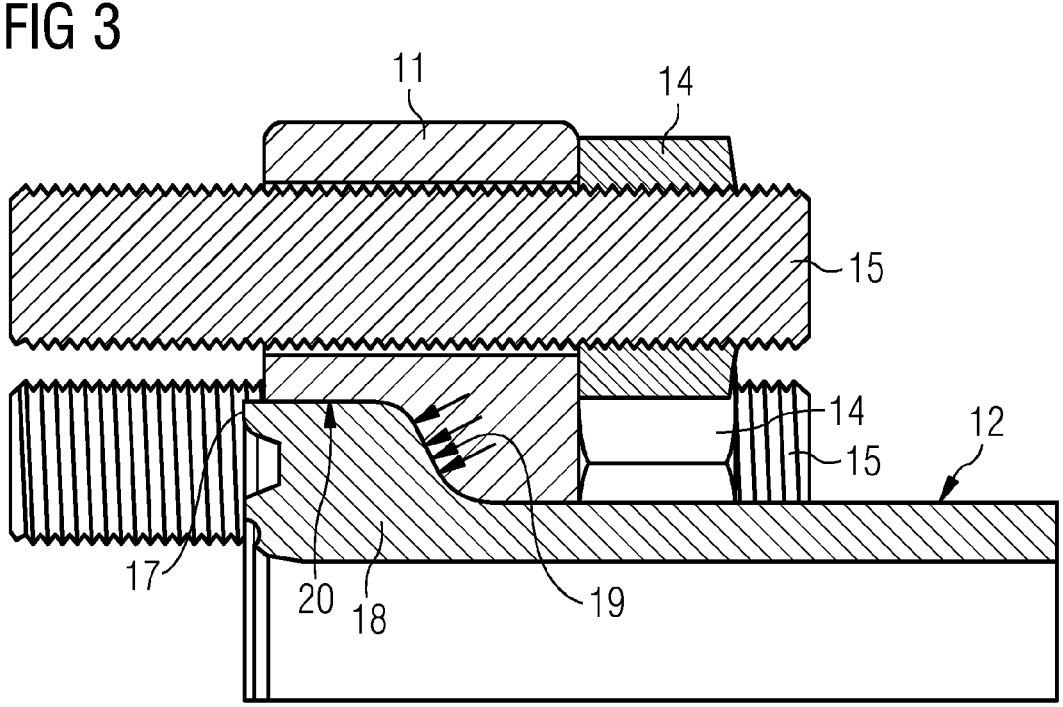
FIG. 3 is an alternative view of part of the subsea module of FIG. 1, illustrating some of the forces when assembled.
Figure 4:
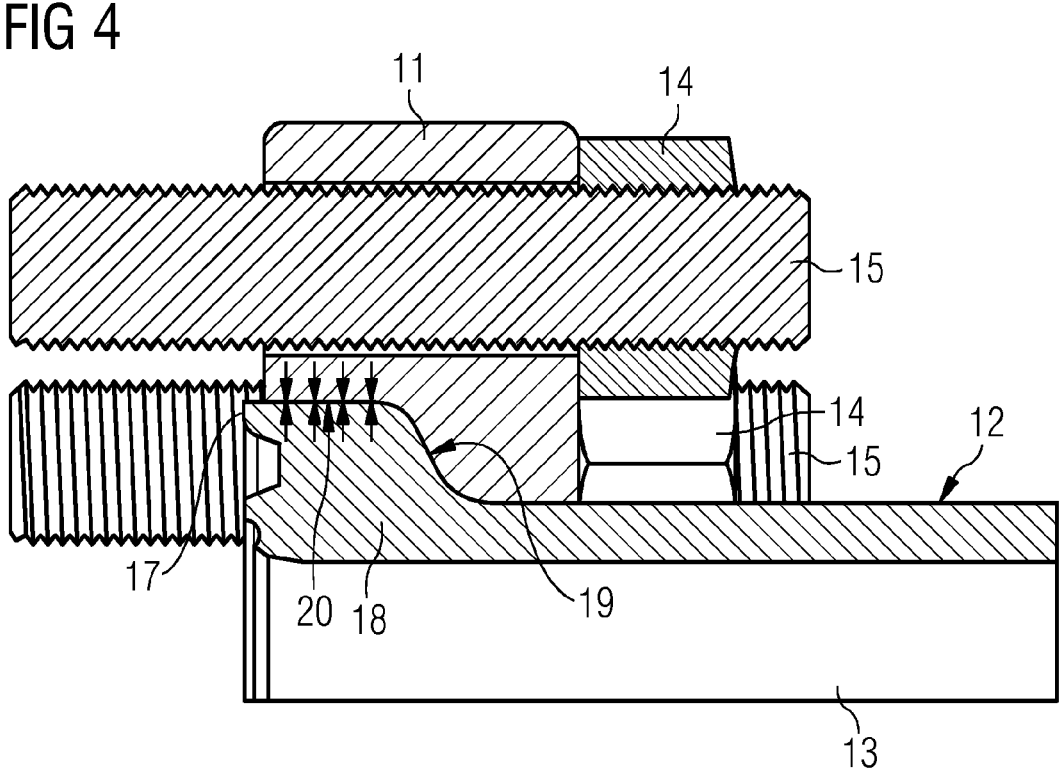
FIG. 4 is an alternative view of part of the subsea module of FIG. 1 illustrating other forces when assembled.

FIGS. 3 and 4 show in more detail how the forces are applied between the two load shoulders 19 of the flange 11 and housing 12. As the flange 11 cools back to its original dimensions, force is applied between contact surfaces 20, substantially perpendicular to those surfaces, as indicated by the arrows. This results in a very effective seal between the two component parts, the flange and housing, so that even when subjected to high pressures when deployed subsea, the structural integrity of the join is maintained. In the transition region, although some of the applied force is due to the flange inner diameter returning to its original dimension, additional force is applied by the tightening of the bolts 15 when the sensor module is installed on equipment. In combination, these forces hold the two load shoulders 19 in contact, with the forces acting substantially perpendicular to the contact surfaces, as indicated by the arrows. When mounted on equipment, tightening of the stud bolts 15 brings the sealing surface of the groove formed between ridges 17 of the flange and housing into contact with the sealing surface of the equipment (not shown).

In FIG. 5, the location of sensing elements and electronics with respect to the flange 11 and housing 12 is illustrated. A sensor probe 22 complete with temperature sensors is mounted one side of a pressure sensing element 24 and electronic cards 23 are mounted in the housing 12.

Figure 6:
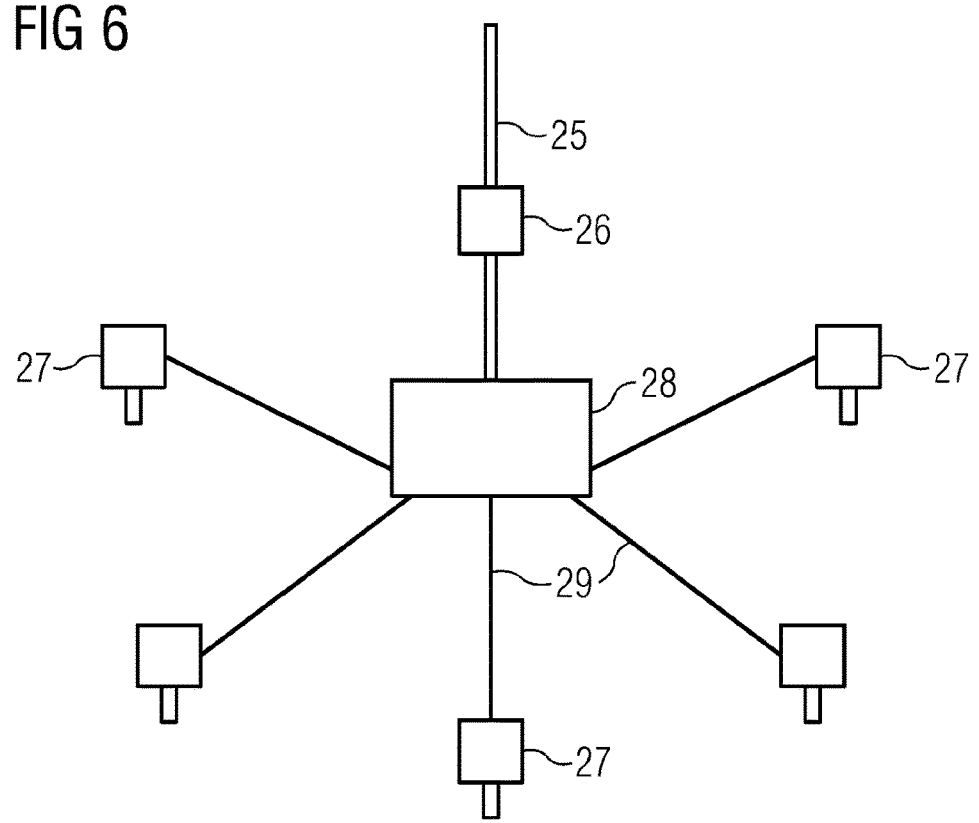
FIG. 6 is a block diagram illustrating a typical subsea system in which the module of FIG. 1 may be used.

FIG. 6 is a block diagram of a typical sensor system in which the sensor module may be used. A subsea manifold 28 comprising valves, subsea control system and sensors, such as pressure and temperature sensors, may be connected via pipeline flowlines 29 to subsea wellheads 27. The subsea wellhead may comprise an X-tree, subsea control system and sensors, such as pressure and temperature sensors. From the manifold, a pipeline riser 25 to topside may be provided with a subsea isolation valve 26 comprising valves, a subsea control system and sensors such as pressure and temperature sensors. In each case, other sensors as described above may be used in addition to, or instead of the pressure and temperature sensors in the system.

FIG. 7 is a flow diagram of the manufacturing process steps. The sensor housing 12, 18 is formed, or if taken from stock, then selected 30. Similarly, the flange 11 is formed, or if taken from stock, then selected 31. To join the ring flange 11 and housing 12, 18 the flange is heated 32 to expand the material from which the flange is made sufficiently for the flange to fit over the housing. The temperature used to heat the flange is not high enough to damage the electronics of the sensors located within the hub housing. The two separate pieces may be joined by sliding 33 the expanded ring flange over the thinner section 12 of the housing, or if heated enough, be passed over the wider section 18 of the housing. The flange is then allowed to cool 34. Once cooled, and therefore shrunk back to its original size, the ring flange 11 assumes a tight fit around the housing and applies a compression force 20 to the outer surface of the housing 18, 12. This compression force from the flange ring is sufficient to allow the design to be rated at higher ratings than would be possible with the conventional, non-shrink fit, swivel ring flange and hub construction, for example up to 15K PSI, because as well as the pressure exerted between the two parts by shrink fitting the flange on the housing, it is possible to use nuts and bolts which meet the standards for rating to higher pressures, in order to fix the flange 11 to the equipment.

In a conventional flange constructed of one piece of material, the flange incorporates a neck radius within the design which extends from the hub (small diameter) to the top of the flange face. This radius is present to ensure there is sufficient strength within the design to withstand the forces produced through applying correct torque to the bolting. Having this radius of material in position on top of the flange face limits the available bolting space on top of the flange. With a split shrink fit design, the neck radius of material is not present as the radius is re-located lower to be within the design of the shrink fit part and away from the flange face. This allows more space for nuts and associated tooling to be fitted. The present invention has a number of benefits, including the fact that using the flange ring to apply compression force allows the housing to be reduced in overall size. The reduction in housing diameter allows more space to accommodate standard compliant stud bolts and nuts, specifically API 6A/ISO 10423 compliant 1" heavy hex nuts.

The reduction in size of the housing dimensions also reduces the cost of the sensor module as the components are simpler in design, smaller and weigh less than in the conventional single piece housing and flange. The housing may be produced from solid alloy 625 material without any need for additional protective cladding, which further simplifies the design and reduces cost. The overall sensor module has a complete alloy 625 primary barrier and secondary barrier which meets enhanced specifications. By separating the housing and flange components, it is possible to provide more customisation in that the ring flange bolt pattern can be varied to suit customers application, such as having a six bolt option, rather than only four. The parts may be held in stock and the specific options selected later in the process of project specification to suit the customer requirement. Compared with the alternative option of keeping the one piece flange and hub housing constructed from solid alloy 625 and reducing the size of the sensor electronics to make it possible to also reduce the size of the housing enough to accommodate API 6A/ISO 10423 compliant heavy hex bolting, the present invention is cheaper, lighter and allows more variation in design and customisation.

Embodiments of the invention have been described with reference to different subject matter. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject matter, any combination of features relating to different subject matter, in particular between features of the method type claims and features of the apparatus type claims is considered to be disclosed by this document too.

It should be noted that the term "comprising" does not exclude other elements or steps and "a" or "an" does not exclude a plurality. Also elements described in association with different embodiments may be combined. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features. It should also be noted that reference signs in the claims should not be construed as limiting the scope of the claims. The invention is not restricted to the details of the foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A subsea sensor module, comprising:
    a sensor housing having a first section that defines a first outer profile, a transition section that defines a transition outer profile, and a ridge portion;
    a module flange having an inner profile that is the same as the transition outer profile, a planar bolt surface, and a bottom surface parallel to and opposite the planar bolt surface;
    a housing shoulder formed as part of the transition outer profile, the housing shoulder defining a first contact face that is not perpendicular to the bolt surface;
    a flange shoulder formed as part of the inner profile, the flange shoulder defining a second contact face that is parallel to the first contact face; and
    wherein the module flange is shrink fit mounted to the sensor housing such that the first contact face and the second contact face contact one another and the ridge portion extends axially beyond the bottom surface of the module flange.

2. The subsea sensor module according to claim 1, wherein the sensor housing comprises a first material and the module flange comprises a second material, different from the first material.

3. The subsea sensor module according to claim 2, wherein the first material remains solid at a higher temperature than the second material.

4. The subsea sensor module according to claim 1, wherein a sensor housing profile defined by the first section comprises a hollow cylinder.

5. The subsea sensor module according to claim 1, further comprising fasteners adapted to fix the module flange and the sensor housing to other equipment.

6. The subsea sensor module according to claim 5, wherein the fasteners comprise stud bolts and hex nuts.

7. The subsea sensor module according to claim 1, wherein the subsea sensor module is rated at up to 15K PSI.

8. The subsea sensor module according to claim 1, wherein the sensor housing comprises a corrosion resistant alloy.

9. The subsea sensor module according to claim 1, wherein the subsea sensor module comprises at least two separate sensing channels.

10. The subsea sensor module according to claim 1, further comprising a pressure sensor, a temperature sensor, or a combination of both pressure and temperature sensors.

11. A method of manufacturing a subsea sensor module, the method comprising:
    selecting a flange that includes an inner profile, a planar bolt surface, and a bottom surface parallel to and opposite the planar bolt surface;
    forming a flange shoulder as part of the inner profile, the flange shoulder defining a first contact face that is not perpendicular to the bolt surface;
    forming a sensor housing to include a first section having a first outer profile, a transition section having a transition outer profile, and a ridge portion;
    forming the transition outer profile to include a housing shoulder formed as part of the transition outer profile, the housing shoulder defining a second contact face that is parallel to the first contact face;
    heating the flange or cooling the sensor housing sufficiently to enable the flange to be mounted radially outwardly of the sensor housing;
    contacting the first contact face with the second contact face to position the ridge portion axially beyond the bottom surface; and
    equalizing a temperature between the flange and the sensor housing to establish a shrink fit therebetween.

12. The method according to claim 11, wherein the sensor housing comprises a first material and the flange comprises a second material, different from the first material.

13. The method according to claim 12, wherein the first material remains solid at a higher temperature than the second material.

14. The method according to claim 11, wherein the first section of the sensor housing comprises a hollow cylinder.

15. The method according to claim 11 further comprising: fixing the subsea sensor module to equipment using suitable mechanical fasteners.

* * * * *